United States Patent
Manin

(10) Patent No.: US 9,529,107 B2
(45) Date of Patent: Dec. 27, 2016

(54) METHOD OF DEPLOYMENT, METHOD AND DEVICE FOR SEISMIC PROSPECTING IN AN AQUATIC MEDIUM

(75) Inventor: Michel Manin, Sainte Mesme (FR)

(73) Assignee: KIETTA, Paris (FR)

( * ) Notice: Subject to any disclaimer, the term of this patent is extended or adjusted under 35 U.S.C. 154(b) by 824 days.

(21) Appl. No.: 13/702,549

(22) PCT Filed: Jun. 10, 2011

(86) PCT No.: PCT/EP2011/059747
§ 371 (c)(1),
(2), (4) Date: Mar. 7, 2013

(87) PCT Pub. No.: WO2011/154545
PCT Pub. Date: Dec. 15, 2011

(65) Prior Publication Data
US 2013/0201790 A1 Aug. 8, 2013

(30) Foreign Application Priority Data
Jun. 10, 2010 (FR) ...................................... 10 54616

(51) Int. Cl.
*G01V 1/38* (2006.01)
*G01V 1/16* (2006.01)

(52) U.S. Cl.
CPC ............. *G01V 1/3817* (2013.01); *G01V 1/168* (2013.01); *G01V 1/3808* (2013.01)

(58) Field of Classification Search
CPC ...... G01V 1/3808; G01V 1/168; G01V 1/3817
USPC .................................................... 367/15–20
See application file for complete search history.

(56) References Cited

U.S. PATENT DOCUMENTS

| | | | |
|---|---|---|---|
| 3,359,536 A | 12/1967 | Coburn | |
| 3,436,776 A | 4/1969 | Davis | |
| 3,953,827 A * | 4/1976 | Le Moal | G01V 1/3835 367/19 |

(Continued)

FOREIGN PATENT DOCUMENTS

| | | |
|---|---|---|
| EP | 0154968 | 9/1985 |
| EP | 884607 | 12/1998 |

(Continued)

OTHER PUBLICATIONS

International Search Report issued for PCT/EP2011/059747 and English language translation, 7 pages.

*Primary Examiner* — Ian J Lobo
(74) *Attorney, Agent, or Firm* — Norton Rose Fulbright US LLP

(57) ABSTRACT

A method for seismic prospecting in an aquatic medium using a device having at least one seismic cable provided with sensors and at least one moving seismic source. The method includes the following steps: 1) moving the cable in the water using two drones each placed at one end of the cable and which maintain tension in the cable, the movement of the cable minimizing the deviation of the cable with respect to a desired route in the terrestrial reference frame where the movement of the cable is also being restricted by a maximum track curvature value in the water, and, at the same time; and 2) moving the seismic source in a reference frame connected to the cable, emitting waves via the seismic source, and sensing reflections of the waves by the cable.

32 Claims, 10 Drawing Sheets

(56) References Cited

U.S. PATENT DOCUMENTS

| | | |
|---|---|---|
| 4,314,363 A | 2/1982 | Thigpen et al. |
| 4,404,664 A * | 9/1983 | Zachariadis .............. B63G 8/42 114/246 |
| 4,745,583 A | 5/1988 | Motal |
| 4,870,626 A * | 9/1989 | Tveit ..................... G01V 1/3835 367/130 |
| 5,166,905 A * | 11/1992 | Currie ....................... G01S 5/30 367/19 |
| 6,028,817 A | 2/2000 | Ambs |
| 6,285,956 B1 | 9/2001 | Bennett et al. |
| 6,456,565 B1 | 9/2002 | Grall et al. |
| 6,590,831 B1 | 7/2003 | Bennett et al. |
| 6,681,710 B2 * | 1/2004 | Semb ..................... B63B 21/66 114/244 |
| 7,112,111 B1 | 9/2006 | King |
| 7,239,577 B2 | 7/2007 | Tenghamn et al. |
| 7,411,863 B2 | 8/2008 | Toennessen |
| 7,933,163 B2 * | 4/2011 | Fossum ................ G01V 1/3826 367/16 |
| 2005/0128874 A1 | 6/2005 | Herkenhoff et al. |
| 2011/0176383 A1 * | 7/2011 | Jewell ................ G01V 1/3852 367/16 |
| 2011/0283797 A1 | 11/2011 | Manin |

FOREIGN PATENT DOCUMENTS

| | | |
|---|---|---|
| EP | 1047958 | 11/2000 |
| FR | 2795527 A1 | 12/2000 |
| FR | 2870509 | 11/2005 |
| FR | 2940838 A1 | 7/2010 |
| GB | 2435931 A | 9/2007 |
| WO | WO-99/01338 | 1/1999 |
| WO | WO-00/67046 A1 | 11/2000 |
| WO | WO-2007/070499 A2 | 6/2007 |
| WO | WO-2010/076646 | 7/2010 |
| WO | WO-2011/154545 | 12/2011 |

\* cited by examiner

METHOD OF DEPLOYMENT, METHOD AND DEVICE FOR SEISMIC PROSPECTING IN AN AQUATIC MEDIUM

CROSS-REFERENCE TO RELATED APPLICATIONS

This is a national phase application of PCT/EP2011/059747 filed Jun. 10, 2011 claiming priority from Application 10 54 616 filed on Jun. 10, 2010 in France.

TECHNICAL FIELD

The present invention relates to the field of seismic prospecting in aquatic mediums (sea or lake).

BACKGROUND OF THE INVENTION

Methods are known consisting of placing a series of parallel submerged seismic cables (or lines or streamers), on each of which sensors of the hydrophone and/or geophone type are placed spaced apart, the cables being pulled by one or more boats.

One (or more) other boat(s), called "source" boats, provided with means capable of creating a wave in a sea medium, generally in the form of an air gun, move at a distance from the sensor cables. The winds thus formed spread as far as the sea bottom, then on the different geological layers to be reflected by the latter, and are lastly collected and measured by said submerged sensors. The source boat may be the boat pulling the seismic cables.

All of the information is then processed to produce a three-dimensional (3-D) image of the different geological layers of the underwater subsoil, generally used to determine the presence of any oil-bearing reservoirs.

This technique has been used for many years and is subject to very restrictive implementation requirements. First, the dynamic noise due to towing of the cables disrupts the measurement of the waves one seeks to collect. Furthermore, the hydrodynamic drag resulting from the drag of the cables is very high, and can be counted in dozens of tons, for example approximately 70 tons, which leads to the use of very powerful pulling boats. This is due in particular to the speed required in the water for the method in the presence of paravanes, which create resistance. Furthermore, the weight and the hydrodynamic drag caused make the pulling cable of the paravanes undergo a dynamic deformation effect of the "piano wire" type during towing. This leads to fatigue of the cable and may cause it to break. This may result in extremely high replacement costs, given the immobilization of the entire device. Furthermore, in the traditional methods, the cables must be weakly submerged, between 5 and 10 m, which causes an accident risk given the circulation of vessels on the surface with a strong draught (oil tankers or container ships) and high sensitivity to the condition of the sea.

Furthermore, the known seismic prospecting devices leave shadow regions during measurement. In fact, the cables generally have a length of up approximately 8 km and are spaced approximately 100 m apart, which leads, for a dozen parallel cables, to a measuring area of 1×8 km. However, the ideal in terms of measurements is to use an isotropic system, i.e. a square surface, for example 8×8 km. However, these dimensions are incompatible with the towing means that would be necessary in light of the weight, drag, and logistics necessary to obtain such a measuring surface.

Efforts have therefore been made to resolve the situation in two known manners.

The first attempt (called Wide Azimuth) consists of making up for the anisotropy, by using one (or two) boats pulling a set of cables forming a measuring area of 1×8 km, and using 2 to 8 source boats. This device has two major drawbacks. First, the prohibitive cost resulting from the investment material, maintenance and use (2 to 8 source boats, plus one (or two) towing boats, plus all of the cables). The other drawback lies in the fact that the source boats "fire" (i.e. emit waves) each in turn, and therefore 2 to 8 times less frequently, which leads to a very low firing density.

The second attempt proposed in a known manner is shown by patent application GB no. 2,435,931, in the name of Western Geco, which describes a method and device diagrammatically consisting of an array of sensors (geophones) fastened to a two-dimensional structure (in the form of a mesh or net) or three-dimensional structure. This structure has a periphery (perimeter or enclosure) kept in shape by dynamic means such as drones or small boats, so as to maintain the shape of the mesh making up the structure. The latter is continuously pulled and one or more seismic sources are provided.

Despite the apparent draw, theoretically speaking, of the device and method thus proposed, the fact remains that this device appears difficult to implement realistically. In fact, the structure thus formed would have an enormous weight and drag and would require the use of means to maintain the shape that are disproportionate and unmanageable both technically and financially or in terms of budget. Furthermore, due to its construction, it only offers a single possible geometry for the array of sensors.

According to another aspect, generally, marine seismic prospecting aims to sense or recover the maximum quantity of signals to perform the most accurate and reliable possible geographical mapping of the underlying areas of the seabed. However, low-frequency signals provide information on very deep reservoirs and are therefore precious in that respect. Low-frequency signals are, however, greatly attenuated by the surface reflection phenomenon, called "phantom," and owing in particular to the fact that the cable, according to the prior art, is submerged several meters from the surface. Efforts are thus made to eliminate these "phantoms" to obtain what is called a "flat spectrum." Attempts have been made to resolve the situation by using a technique known as "over-under" that consists of positioning two cables bearing hydrophone sensors, one under the other vertically, at respective depths for example of 20 m and 26 m. The processed combination of the two signals received by the two respective cables makes it possible to attenuate or eliminate the consequences of "phantoms." However, this known method, aside from the additional processing it requires, has the major drawback of very greatly decreasing productivity and increasing costs, due to the doubling of the cables and sensors.

Another known techniques seeking to eliminate "phantoms," proposed by the company PGS, consists of using lines or cables bearing, in addition to the hydrophones (measuring the pressure), geophones or accelerometers capable of measuring the speed or acceleration of the wave. Reflection coefficients for the respective pressure (hydrophones) and speed (geophones) measurements being inverses (−1 and +1), it is thus theoretically possible to cancel out the "phantoms." This known technique has the drawbacks of requiring a high investment in terms of sensors and creating bothersome noise at the geophones or accelerometers resulting from the pulling speed (approximately 5 knots) generating parasitic vibrations.

The invention proposes to resolve at least some of the aforementioned drawbacks.

BRIEF SUMMARY OF THE INVENTION

To that end, according to a first aspect, the present invention proposes a seismic prospecting method in an aquatic medium using a device comprising at least one seismic cable provided with sensors and at least one moving seismic source. The method comprises the steps consisting of moving the cable in the water, and, at the same time, moving the seismic source in a reference frame connected to the cable, emitting waves via the seismic source, and sensing reflections of the waves by the cable. The movement of the cable minimizes the deviation of the cable relative to a desired route in the terrestrial reference frame. The movement of the cable is also restricted by a maximum track curvature value in the water. In other words, the movement of the cable in the water is defined by a program for minimizing the deviation of the cable relative to the desired route, with the constraint of the maximum track curvature value in the water.

According to another aspect, the invention proposes a deployment method (i.e. movement method) in an aquatic medium for a device comprising at least one seismic cable provided with sensors. The method comprises a step consisting of moving the cable in the water. As in the seismic prospecting method, the movement of the cable minimizes the deviation of the cable relative to a desired route in the terrestrial reference frame and is also restricted by a maximum track curvature value in the water.

The invention also proposes a seismic prospecting device, for example like that used in the seismic prospecting method or the deployment method. The device comprises at least one cable provided with sensors, and a computation unit for determining the movement of the cable in the water. The computation unit computes the movement of the cable that minimizes the deviation of the cable relative to a desired route in the terrestrial reference frame, the movement of the cable also being restricted by a maximum track curvature value in the water. In other words, this computation unit can resolve the program to minimize the deviation of the cable relative to the desired route, with the restriction of the maximum track curvature value in the water.

The cable may also, in a suitable manner, be provided with two drones each connected to one end of the cable. In that case, the drones can charge the cable and set it in motion in the aquatic medium by exerting a tension force on the cable. The expression "motor" drone can then be used to designate the drone exerting the dominant tension force. In other words, the motor drone sets the cable in motion by "pulling" it.

BRIEF DESCRIPTION OF THE DRAWINGS

Other features and advantages of the invention will appear upon reading the following description of one preferred embodiment of the invention, provided as an example and in reference to the appended drawings, which show.

DETAILED DESCRIPTION OF THE INVENTION

A method for seismic prospecting in an aquatic medium, for example a sea or lake, can be carried out using a device comprising at least one seismic cable provided with sensors and at least one moving seismic source, positioned in the water so as to allow prospecting of the determined area of the subsoil. The method comprises moving the cable in the water and, at the same time, emitting waves via a seismic source, preferably submerged, which makes it possible to decrease noises. The waves, for example acoustic waves, are reflected in the subsoil by the interfaces between the geological layers of the aforementioned area and the bottom of the aquatic medium and picked up by the cable.

Figure 1:
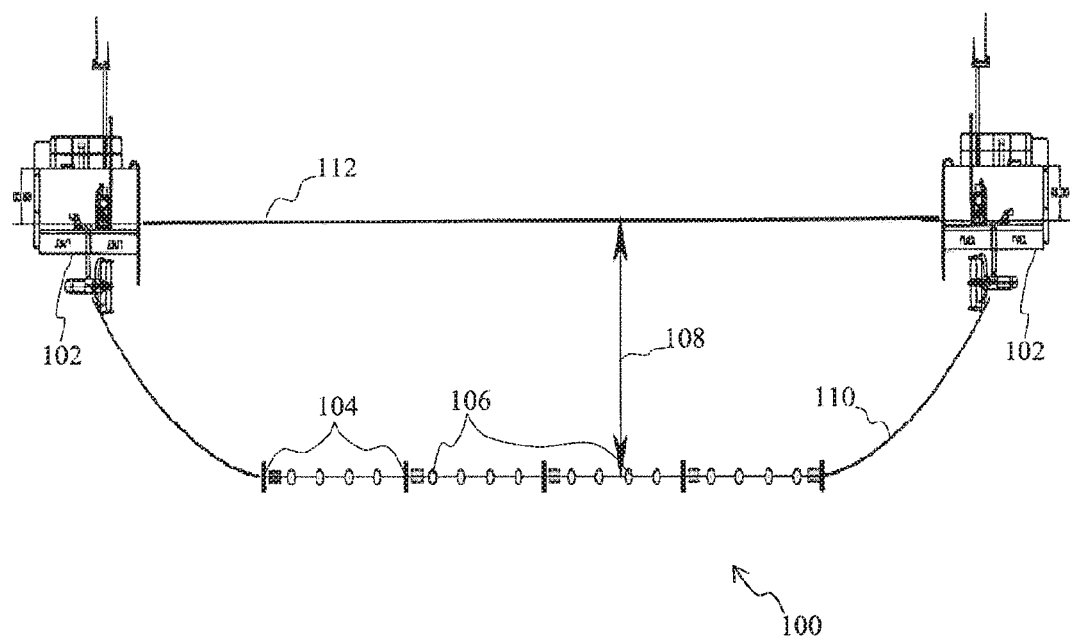
FIG. 1 shows a diagram of a prospecting device.

FIG. 1 shows an example of such a seismic prospecting device 100. The moving seismic source is not shown in the figure. The seismic source is capable of creating a disturbance transmitted by the aquatic medium in the form of waves. The device 100 comprises at least one cable 110, and preferably several, provided with a plurality of seismic sensors 106 (e.g. hydrophones) capable of collecting said reflected waves. Such a cable can be called a "seismic cable" or "seismic flute." The cable 110 turns into a measurement station adapted for prospecting part of the aforementioned area of the subsoil. Typically, to carry out the method, said seismic source is triggered. Said reflected waves are sensed using said sensors 106. The cable 110 on the one hand and the seismic source on the other hand are then moved to another measuring station suitable for prospecting another part of the aforementioned area, and so forth.

The cable 110 evolves in the water. In general, it can be immobile, i.e. with respect to the drift, or it may move in the water. The seismic source moves, during the prospecting method, in a reference frame connected to the cable. This means that the seismic source moves globally relative to the cable. This makes it possible to increase the number of measurements in a shorter time. It is for example possible to take a reference frame whereof the origin is one end of the cable, or the middle of the cable, and the axes of which are orthogonal, one of the axes being in the direction tangent to the cable at that origin. The seismic source is at a distance from the cable allowing the cable to pick up waves emitted, then reflected by the geological layers of the subsoil and the bottom of the aquatic medium.

The evolution (the term "evolution" may designate "movement" hereafter) of the cable 110 is restricted by a maximum track curvature value in the water and by a maximum deviation value relative to a desired route the terrestrial reference frame. The route is appropriately subject to a maximum speed value relative to the terrestrial reference frame.

"Track" refers to a set of pairs (u, t), where u represents a position of the water reference frame and t represents a moment, the successive positions along a continuous curve corresponding to a parameterized arc whereof the parameter is the time. The set may be discreet in time, one time pitch then separating two successive positions, or continuous in time (the track is then the aforementioned parameterized arc). The cable 110 may potentially move in the water reference frame. When this is not specified, the track refers to given positions in the water reference frame. In the case at hand, the track of the cable 110 is understood in reference to the water reference frame.

The track thus defined corresponds to the movement of a point. By extension, the cable 110 is said to evolve in the water along the track because if one of its ends A or B is in motion, it is considered that the rest of the cable 110 is dragged in the wake and therefore follows the same track in the water reference frame. The cable 110 is therefore moved along its axis. If the cable is on the contrary adrift, one may refer to a zero track, since the track is reduced to a fixed point in the water reference frame. The curvature of track is the curvature of the aforementioned parameterized arc corresponding to the track, using the traditional definition of the curvature of a parameterized arc.

"Restrict" means that the method ensures that the cable cannot follow a track having a curvature greater than the maximum curvature value, and the cable does not move away from the desired route beyond the maximum deviation value. The method may potentially therefore comprises a verification step ensuring that these restrictions are respected and providing a correction step if necessary.

Restricting the evolution of the cable 110 by a maximum curvature value makes it possible to decrease energy expenditures and the mechanical forces undergone by the cable. Furthermore, the aquatic current (for example, the sea current if a sea medium is involved) may be considered homogenous over the length of the cable 110 at a given moment of the evolution. Restricting the track by a maximum curvature value thus makes it possible to impose a minimum radius on the cable 110. This makes it possible to avoid excessively disrupting the geometry of the cable 110 to preserve an effective usage length of the cable 110 during the measurements and to thereby obtain a better seismic density (i.e. distribution of the reflection points of the waves on the cable 110).

The evolution of the cable 110 is also restricted by a maximum deviation value relative to a desired route in the terrestrial reference frame. A route is a set of positions in which one aims to position the cable relative to the terrestrial reference frame. For example, if the cable 110 is discretized in N points P1 . . . PN, the route may be given by N parameterized arcs (Pi, t) each corresponding to the position of a point Pi of the cable 110, in the terrestrial reference frame, as a function of the time. It is also possible, by approximation, to represent a route by a single parameterized arc, then corresponding to the positions of the terrestrial reference frame of a point of the cable as a function of the time, for example the medium of the cable. In general, there is a route from which the cable does not move away during its evolution in the water. The route is appropriately subject to a maximum speed value relative to the terrestrial reference frame. Thus, there is a low-speed reference in the terrestrial reference frame from which the cable never moves away beyond the maximum deviation value. The maximum deviation value restriction combined with the fact that the route is subject to a maximum speed makes it possible to monitor the positioning of the device relative to the part the region of the subsoil to be prospected, and thus to obtain a better seismic density. Reference is made to a "desired" route, as this is a route that the cable should ideally follow, relative to which deviations are allowed (within the limits allowed by the maximum deviation value), which makes it possible to decrease the mechanical stresses undergone by the cable as well as fuel consumption.

The method will now be described according to a first example embodiment. In this first example, the cable evolves in a sea medium. The desired route comprises a position of the terrestrial reference frame fixed for a period of time. In other words, over this period of time, the route is combined with a point that does not move in the terrestrial reference frame. The cable is then said to be kept, during the period of time, in a quasi-stationary or stationary ("substantially stationary") position, since the cable never moves away from the stationary position in question beyond the maximum deviation value.

In fact, a cable evolving in an aquatic medium is said to be "kept in a quasi-stationary position" ("stationary position," respectively) if it evolves in the water (e.g. along a "track" as defined above) so as to remain quasi-stationary (completely stationary, respectively) in the terrestrial reference frame (i.e. the "absolute" reference frame). In other words, the projection of the cable on the seabed never moves away beyond a predetermined value (i.e. maximum deviation value) from a fixed position of the terrestrial reference frame during a given period of time. The maximum deviation value may be related to the dimensions of the cable. In one example, the deviation of the cable relative to the fixed point is computed as being the distance between the middle of the cable (or any other point of the cable) and the fixed point. The quasi-stationary nature is then translated by a deviation preferably smaller than 10 times the length of the cable, still more preferably less than two times the length of the cable, and even more preferably less than the length of the cable, or the half-length of the cable (these values are also applicable to the other examples of the method). In general, the more the deviation is restricted by a low maximum value, the more the firing density at the measuring station is distributed homogenously over the field. This makes it possible to collect data allowing a good analysis of the part of the region of the subsoil to be prospected below the measuring station in a shorter amount of time, the extreme case being that of being completely stationary.

The cable(s) 110 being kept in a quasi-stationary position, its lifetime is increased, as it undergoes fewer stresses than a cable that is endlessly pulled at a significant speed. Furthermore, if the cable 110 is equipped with hydrophones or geophones, or vertical pairs of hydrophones, it may be submerged more deeply than pulled cables, which protects against accident risks with other vessels and limits noise generation, in particular by the waves. In this way, the cable is even more protected inasmuch as it is submerged at a greater depth 108 (i.e. the distance relative to the surface 112 of the water). Furthermore, the device makes it possible to perform more effective and rapid seismic prospecting, as the measurements can be corrected for the harmful effect of phantoms. The cable is preferably submerged, between two waters (i.e. the cable is not at the surface 112 or down at the bottom of the sea—where the ground may be uneven, which generates noise in the reception of the signal) at a depth that may be between 5 and 1,000 m, preferably between 5 and 500 m, preferably between 10 and 300 m, preferably between 20 and 200 m, and still more preferably between 50 and 100 m. The cable 110 is suitably provided with ballast-forming elements 104 designed to keep the cable submerged. The ballasts allow the cable to keep its depth substantially constant and to vary in a controlled manner.

The cable 110 is suitably provided with symmetrical pulling means (i.e. exerting a tension force) at both ends thereof, for example drones 102 as in the example of FIG.

1. The drones 102 are of a type known in itself, for example floating, or semi-submersible with diesel propulsion or of the electric type powered by a cable connected to a power source on the main boat. The drones 102 can have propulsion means (propeller) so as to pull and maintain the tension on the cable 110, and more specifically such that the central portion bearing the sensors 106 is substantially horizontal, as is the case in FIG. 1, and positioned at a constant aforementioned depth 108. The device 100 can be designed to have zero or slightly positive buoyancy. The drones appropriately also have electrical connection means with the respective cables for communicating data and power, and means for recording seismic data.

The maintenance in the quasi-stationary position requires less energy than towing, particularly inasmuch as the number of cables 106, their size and their mass are significant. Preferably, the device 100 comprises between 10 and 50 cables 110, or between 15 and 30 cables 106, or 20 cables 106. The cables have a length comprised between 1 and 20 km, preferably between 2 and 6 km (preferably approximately 4 km) or between 6 and 14 km (preferably approximately 8 km). In general, the configuration that allows a proper study of the region of the subsoil to be prospected with the smallest possible quantity of resources, and therefore the lowest costs, is a configuration comprising between 15 and 25 cables, preferably between 18 and 22 cables, still more preferably 20 cables, the cables having a length L such that L=k*d where d is the depth of the target, i.e. the region of the subsoil most interesting for prospecting, and k is a factor preferably comprised between 0.8 and 1.5, and still more preferably substantially equal to 1.

Typically, in a measuring station, the device 100 is made up of several cables 110 that evolve in the water so as to be kept in a quasi-stationary position substantially parallel to one another so as to form a grid above the field to be explored. The cables 110 can then be positioned within the device 100 such that, if they are rectilinear, they substantially form a square. The moving source moves above said field and intermittently emits waves. The reflected waves make it possible to collect data usable by geologists. These operations in a single measuring station typically last several days, for example one week.

In a first scenario, the movement of the seismic source comprises following several lines substantially perpendicular to the cable, the period of time during which the cable evolves in a quasi-stationary manner (or stationary in particular cases) being substantially equal to the duration of the following of the lines. In other words, while the cable is kept in a substantially stationary position relative to the terrestrial reference frame, the source pulls waves along the lines perpendicular to the cable. The points from which the source emits a wave thereby form a grid of points above the portion of the region to be prospected. This allows optimal coverage of the portion in question.

In another scenario, the movement of the seismic source comprises following a line substantially perpendicular to the cable and preferably passing substantially at a middle of the cable, the period of time being substantially equal to the duration of the following of the line. In that scenario, during the period where the cable is kept quasi-stationary, a single line is therefore followed.

The route can then comprise other positions of the terrestrial reference frame corresponding to other portions of the region to be prospected, each other position being fixed for a respective period of time, each respective period of time being substantially equal to the duration of the following of the line. In other words, the cable is kept in a first quasi-stationary position. During the maintenance time in that first position, a first line of fire is followed by the source. The cable is then brought into a second quasi-stationary position, where it is kept for a second period of time. During the second period of time, a second line of fire is followed by the source. This is repeated, such that, as for the first scenario, a grid of points is obtained above the field to be studied with the same advantages. It should be noted that each time, the line is that which is perpendicular to the cable and preferably passing through the middle thereof. In this way, the movement of the source in the reference frame connected to the cable, outside periods where the cable is not kept in a quasi-stationary position, consists of back-and-forth movements along that line.

The route may also comprise longitudinal movements of the cable between the fixed positions of the terrestrial reference frame. These movements make it possible to move the cable from one quasi-stationary position to another with less effort.

To keep a traditional object, such as a boat or an oil platform, in a stationary position relative to the seabed despite the currents, its position may be modeled by a point and monitored with respect to a reference position (i.e. absolute position). Any deviation relative to the desired absolute position, for example given by GPS sensors, initiates a reaction by the propellers of the object to return it to its desired position, which the dimensions of the object make it possible to do without undue effort.

Two reference frames may be considered: the "water" (or sea) reference frame, in which the object navigates, and the "absolute" reference frame, connected to the bottom of the sea or the terrestrial reference frame. In the presence of a constant sea current $\overline{Vc}$ and a circular tide current $\overline{Vm}$, the water reference moves relative to the absolute reference with the speed factor: $\overline{Vea}=\overline{Vc}+\overline{Vm}*\cos(\omega t)$ designating the characteristic pulse of the tide current and t designating the time.

If $\overline{Voe}$ designates the speed factor with which the object moves relative to the water reference, the object moves in the absolute reference with the speed factor that is the sum of the two preceding speed vectors, i.e.: $\overline{Voa}=\overline{Voe}+\overline{Vea}=\overline{Voe}+\overline{Vc}+\overline{Vm}*\cos(\omega t)$.

For the object to be completely stationary in the terrestrial reference frame, its absolute speed must be zero, i.e. $\overline{Voa}=0$. This means: $\overline{Voe}=-\overline{Vea}=-\overline{Vc}-\overline{Vm}*\cos(\omega t)$.

Figure 2:
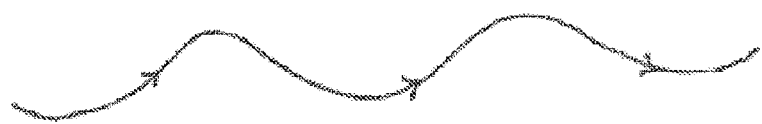
FIGS. 2-4 show track trajectories for fixed route.
Figure 3:
Figure 4:
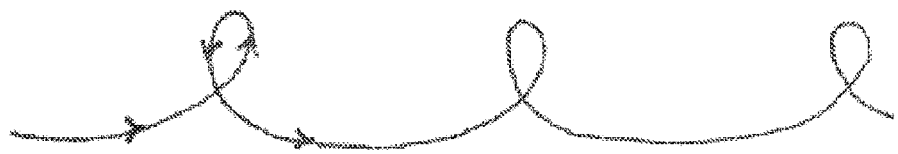

In other words, the object must move in the water at an inverse speed from the speed of the sea current at the considered moment t. In so doing, its track in the water reference is given by the integral of $\overline{Voe}$ and the trajectory of the track is a complex curve illustrated in FIGS. 2-4. If Vc>Vm, the curve has the form shown by FIG. 2. If Vc<Vm, the curve has the form shown by FIG. 3. If Vc=Vm, the curve has the form shown by FIG. 4. These figures show that, depending on the current, the track of the object in the water may have loops and even inflection points.

In the context of the method, to keep the cable 110 or any other seismic cable in a quasi-stationary position relative to the terrestrial reference frame, the cable 110 is made to evolve in the water, following a quasi-stationary track (i.e. the cable 110 is made to evolve with a maximum deviation restriction relative to a desired route that is a fixed point of the terrestrial reference frame), the quasi-stationary track being restricted by a maximum curvature value.

The length of the cable 110 may be at least 100 times more than its transverse dimensions. The transverse drag of the cable 110 is then considerably greater than its longitudinal drag. Moving the cable 110 in the water along its axis is relatively easy. On the contrary, navigating it in the water perpendicular to its axis is extremely difficult. Typically in the latter case, for a cable several kilometers long and 10 cm in diameter, the drag will be several tens of tons at a water speed of 1 knot, which is too high. Furthermore, the resulting forces on the cable 110 would produce stresses leading it to break.

Figure 5:
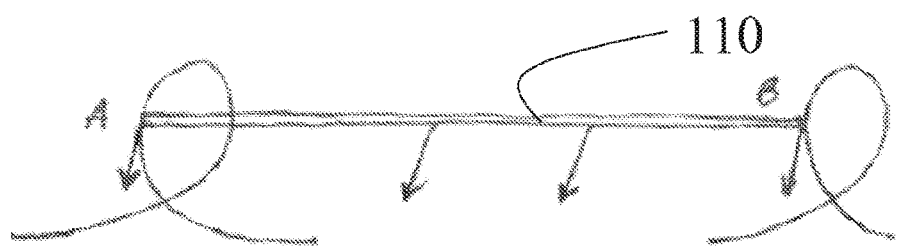
FIG. 5 show the theoretical track of a cable subject to the current of FIG. 4 for a fixed route.

Keeping the cable 110 in a completely stationary position with the known methods would require motor means and forces exerted on the cable 110 that would be too significant for certain types of sea current. For example, if one considers that the current is like that to which FIG. 4 refers, it will be necessary for each of the points of the cable to follow a track in the water like that of FIG. 4. In particular, and as shown by the arrows in FIG. 5, the ends A and B (and therefore all of the other points) of the cable 110 would follow, at moments in the water reference, a track with a strong transverse component (i.e. perpendicular to the axis of the cable 110). This would cause the aforementioned drawbacks.

The method proposed for maintenance in the quasi-stationary position therefore makes it possible to obtain the advantages of maintenance in a quasi-stationary position, i.e. decreased noise, decreased energy costs relative to towing, authorization to submerge the cable more deeply when it is towed, while decreasing energy expenditures and the mechanical forces exerted on the cable 110.

We will now explain in more detail how a cable can be kept in a quasi-stationary position for a given period of time.

Figure 6:
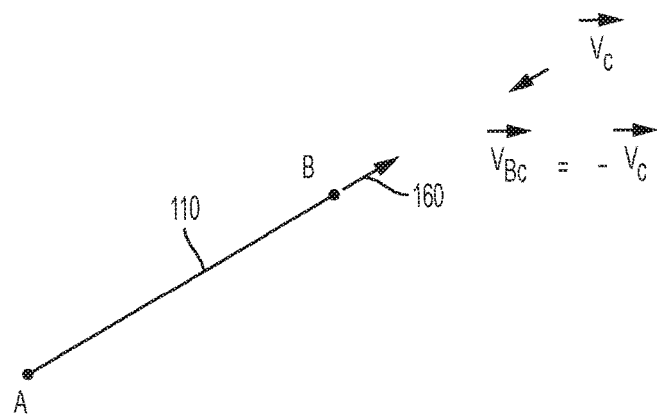
FIGS. 6-7 show the movement of the cable with a desired fixed route.
Figure 7:
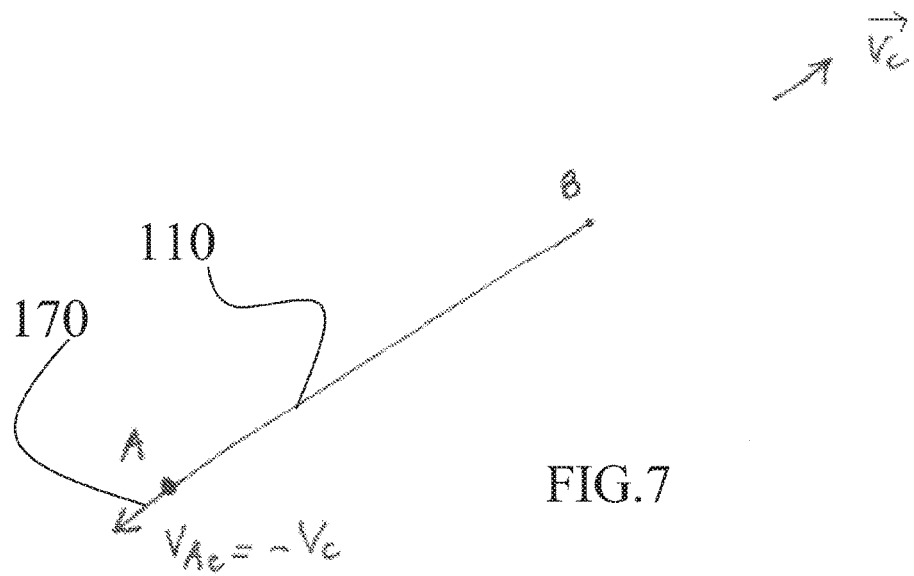

For example, as illustrated in FIG. 6, in the case of a current $\overline{Vc}$ with variable intensity but constant direction, the cable 110 is in the direction of the current and is moved faced with the current along the arrow 160 at a speed opposite that of the current at all times. In that case, the cable 110 is completely stationary in the absolute reference. The cable 110 evolving in the water along its axis, it does not undergo excessive drag or stresses. If the current reverses while keeping the same direction, as shown in FIG. 7, the cable 110 remains in the same direction but moves in the opposite sense shown by the arrow 170.

The maximum curvature can depend on the length L of the cable 110. Thus, the maximum curvature may be a decreasing function of the length of the cable 110. For example, it is possible to have a maximum curvature equal to q/L with q typically between ¼ and 1. Such a dependency allows a better seismic density.

The cable 110 is suitably set in motion by one or the other of the two drones, such as the drones 102 of FIG. 1, each placed at one end A or B of the cable 110. This allows a rapid and simple inversion of the direction of movement of the cable 110. At a moment of the movement, for example, one of the two drones pulls the cable 110 in heading while the other drone helps maintain minimum tension in the cable 110. In particular, the drone at the front of the direction of movement orients the cable 110 by orienting itself and exerting a greater pulling/tension than the rear drone. This prevents the cable 110 from leaving the track followed by the front end of the cable 110 through lateral movements. The rear drone pulls in the opposite direction in the axis of the cable 110 so as to exert a minimum tension typically greater than 50 kg and less than 500 kg, which prevents compressions of the cable 110. The two drones can pull alternating with one another. Typically, the transition of the pulling from one drone to the other may be subject to the tension of the cable. This for example occurs when the measured tension is below a predefined value. It may be possible to orient the drones within narrow limits.

The method suitably comprises, before the step for evolution of the cable, the following steps: providing prediction values for the sea current; determining a theoretical track of the cable in the water precisely corresponding to the desired route, as a function of the prediction values of the sea current (a track is determined in the water ensuring that the desired route is followed exactly); determining an actual track of the cable in the water by approximating the theoretical track while minimizing the deviation between the actual track and the theoretical track, the minimization being restricted by the maximum curvature; evolution of the cable comprising the movement of the cable in the water along the actual track. This allows management of the energy consumption and management of mechanical stresses on the cable, which are optimal.

In one application to the first example, which may be generalized to all of the described examples of the method, the method for keeping the cable 110 in a quasi-stationary position comprises a step for providing predictive values of the sea current. These values may for example be provided by specialized institutes, or obtained in real-time using current measuring means. In this example, the method also comprises the determination of a stationary track relative to the terrestrial reference frame in the sea medium as a function of the prediction values of the sea current. To that end, the predicted current may be integrated into the time to provide the stationary track with a periodic reference. The method comprises a step for determining the quasi-stationary track by approximating the stationary track while minimizing a deviation between the quasi-stationary track and the stationary track. The minimization is restricted by the maximum curvature value. This may be done by filtering (i.e. smoothing) the stationary track, with the restriction that the filtered (i.e. smooth) track, i.e. the quasi-stationary track, must have a curvature smaller than the maximum curvature value at all times. The smoothing may comprise an interpolation, for example polynomial, of the stationary track, or a regression of the stationary track. The cable is then moved in the sea medium following the quasi-stationary track thus determined.

This example may be applied using real-time instructions, said instructions being able to be deduced from the currents and sent to the drones. The heading of the drones is given by the quasi-stationary track.

As already explained, it is possible, by integration, to calculate the track in the water of a periodic virtual element (hereafter called the reference (or target) R) and which will be kept in a stationary absolute position, for example using traditional means. The stationary track corresponding to all points of the cable 110 cannot be monitored, if it is too complex, for the reasons mentioned above. However, the cable 110 can follow a smooth track without significant restrictions, which in particular avoids loops and inflection points. The smoothing may be done over a length comprised between 0.5 times and 3 times the length of the cable 110. The result of such smoothing is shown in FIG. 8, where the solid line indicates the trajectory (i.e. the set of positions P) of the stationary track of R, and the mixed line indicates the trajectory of the quasi-stationary track determined by approximating stationary track.

Figure 8:
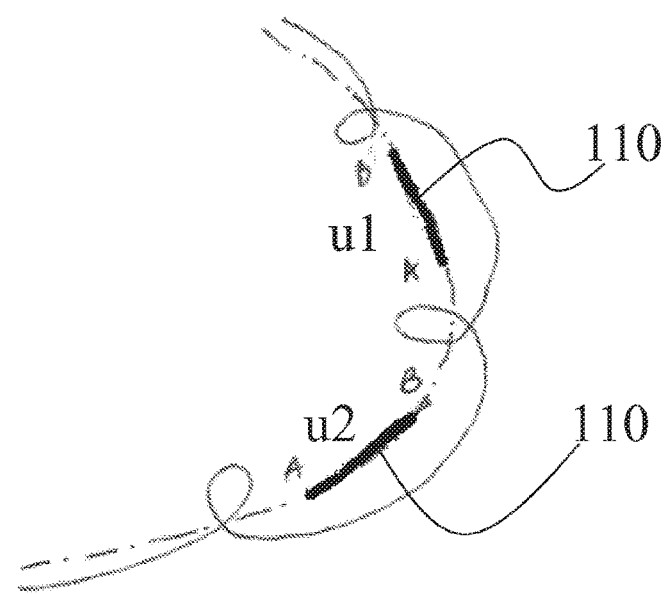
FIGS. 8-13 show the evolution of the cable with a desired fixed route in the event current predictions are available.

The cable 110, at the ends A and B, therefore follows the quasi-stationary track, and it can be seen in two different positions u1 and u2 in FIG. 8. As is the case in FIG. 8, over time, the orientation of the cable 110 may change, as the trajectory of the quasi-stationary track may itself be curved over the long term. To leave the cable 110 the possibility of turning on itself over that long term, it is possible to model the deviation between the quasi-stationary track and the stationary track by the deviation between a point M of the cable and its reference position RM (the position it would have had if it had followed a completely stationary track). This point M may be any point of the cable 110, for example the middle thereof. Choosing the middle yields the best seismic density. The minimization of the deviation between the quasi-stationary track and the stationary track may then consist of incorporating, for the overall movement, the distance between M and RM.

Figure 9:
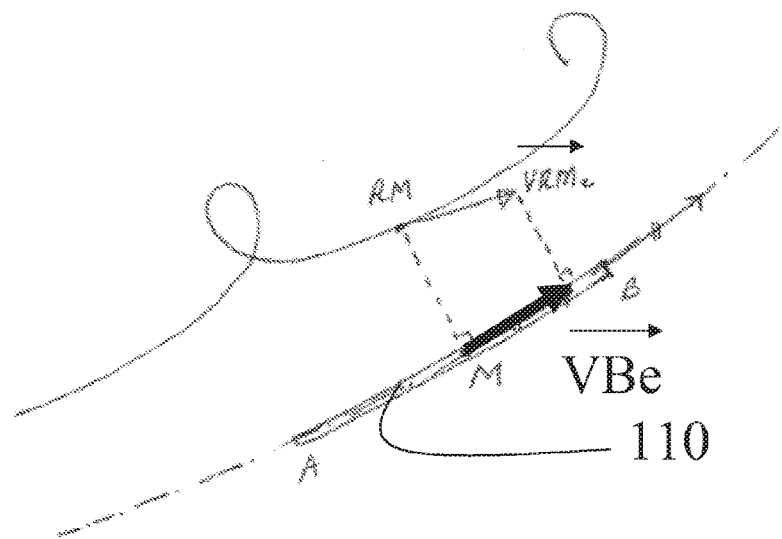

In the configuration of FIG. 9, which shows the trajectory of the quasi-stationary track and the trajectory of the stationary track in solid lines, offset out of a concern for clarity, the reference point RM advances in the water at the speed $\overline{VRMe}$ (inverse of the actual current). The drone of the end B pulls the cable 110 with the water speed $\overline{VBe}$ that is the projection of the vector $\overline{VRMe}$ over the filtered track. The drone is therefore speed-enslaved such that M remains as close as possible to RM. The drone is also heading-enslaved by the definition of the filtered track. The propeller at A may be inactive or ensure minimal tension, as indicated above.

In this way, the point M always remains a minimal distance from RM. In the absolute reference, this distance is the same, since the two points RM and M undergo the same current. Thus, according to this principle, the selected point M of the cable 110 remains a minimal distance from the targeted absolute position. Furthermore, the propeller B, navigating over a smoothed track, does not impose significant restrictions on the cable 110.

Figure 10:
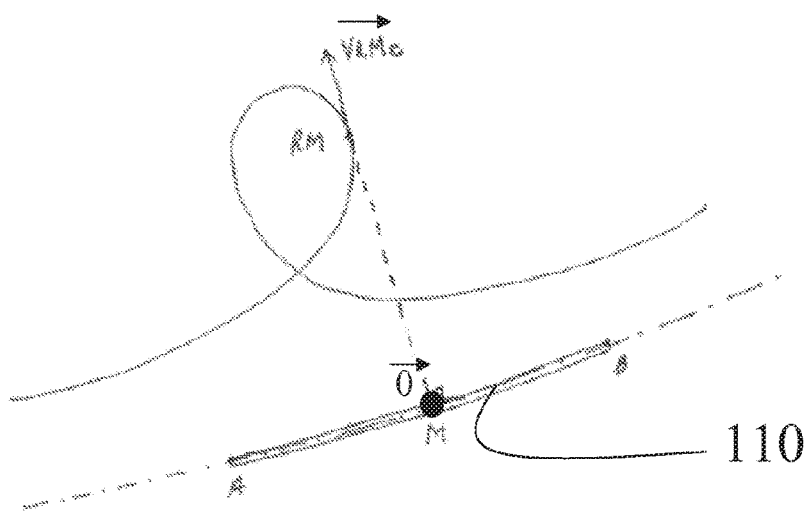
Figure 11:
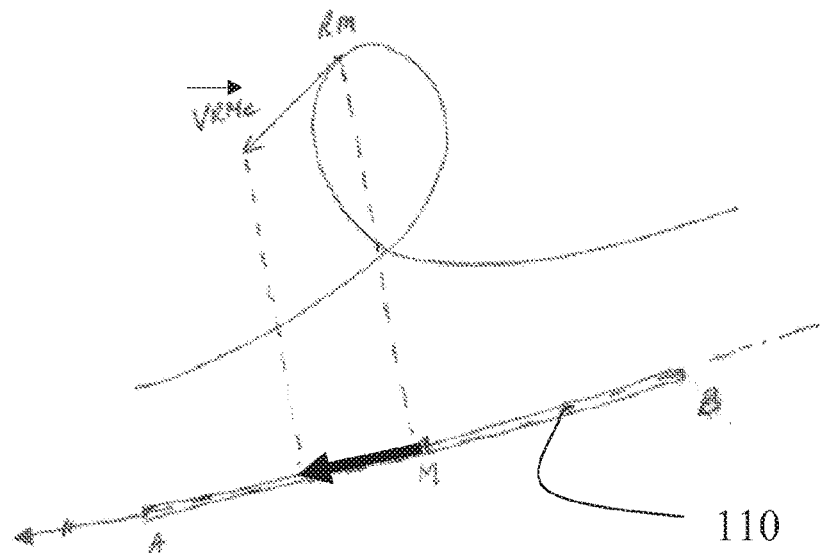

The drone at B may stop pulling. The drones A and B can trade functions, the drone at A then taking command with the same speed-enslavement principle and B being inactive or providing a minimal tension. This makes it possible, if the projection of $\overline{VRMe}$ over the quasi-stationary track cancels out and changes signs, to inverse the pulling direction, as shown in FIGS. 10 and 11.

With such a method, the speed factor of the ends A or B always has a smooth direction: there are no significant heading changes, resulting in the absence of stresses on the cable 110 thus moved. The module of the speed is given by the projection of the speed of the reference (inverse of the actual current) over the trajectory of the filtered track: the cable 110 therefore remains at a minimal distance from that reference.

Figure 12:
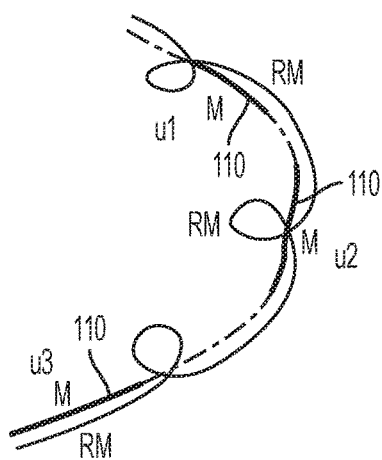
Figure 13:
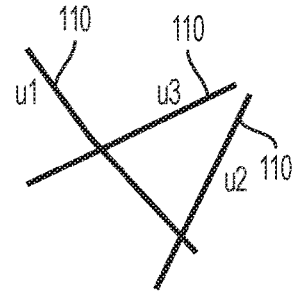

As illustrated by FIGS. 12 and 13, this is also true in the absolute (terrestrial) reference frame. FIG. 12 shows, in the water reference frame, three successive positions (u2, u2, u3) of the cable during the movement. FIG. 13 shows these three successive positions (u1, u2, u3) in the absolute reference frame. The selected point M (for example, the middle) remains at a minimal distance from the fixed point RM. The absolute position of M given by the vector $\overrightarrow{M-RM}$ may fluctuate, but only according to the high-frequency component of the current (tide component, for example). It therefore describes a small closed curve over time. The orientation of the cable 110 changes, according to the very low-frequency (not filtered) component of the current.

In reference to FIGS. 14 to 17, the method may alternatively, for example in the absence of current predictions, comprise a step for the real-time provision of a target position (the target position being the stationary position that corresponds to the fixed position of the route in the present case, and a desired target position deduced from the desired route according to the moment t in the general case of all of the described examples) and a movement step toward the target position, the movement being restricted by the maximum curvature value. The two provision and movement steps are then repeated. This makes it possible to keep the cable 110 in a quasi-stationary position despite the lack of predictions. Typically, the repetitions occur at regular intervals. Alternatively, the intervals may vary and depend on the current. At each interval, the deviation is observed relative to the stationary position, and it is produced while taking into account the maximum curvature value, which makes it possible to avoid motor means or excessive exerted stresses. The space between two intervals typically lasts from several seconds to several tens of minutes, preferably between 1 and 10 minutes.

The ends A and B of the cable 110 may be equipped with absolute positioning (e.g. GPS), as well as traditional sensors for water speed, heading, tension on the object. The point M of the cable may also be equipped with a speed measurement relative to the water and heading measurement (fluxgate magnetic compass, for example). Furthermore, the assembly is positioned using known relative means (acoustic, magnetic compass) potentially calibrated on the GPS position of the propellers (methods known in themselves).

The target stationary position may be the position in the absolute reference frame of the reference RM of M. For any point M of the cable 110, for example the middle, it is therefore the position in the water reference frame that it must have to be stationary.

Figure 14:
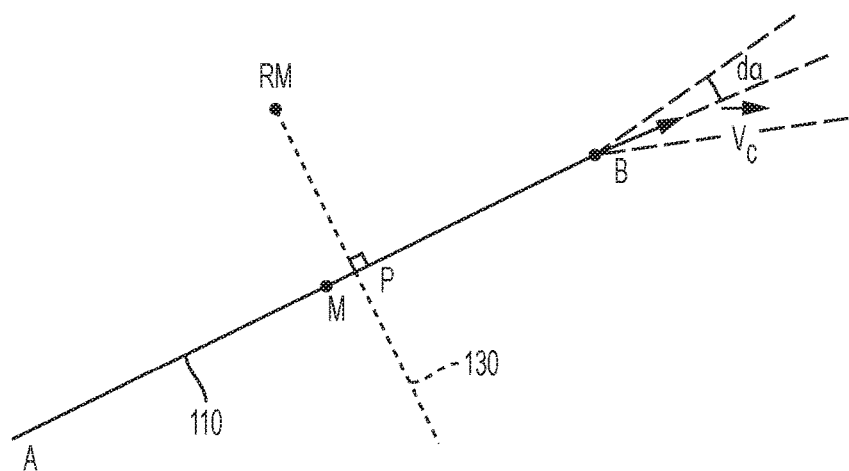
FIGS. 14-17 show the movement of the cable with a desired fixed route in real time.

As illustrated in FIG. 14, the movement toward the target position RM can comprise a projection step for the target position RM on the cable 110 at a point P and the step for computing the maximum header restricted by the maximum curvature value and the speed of the cable in the water. The projection step may comprise the determination of a straight line 130 perpendicular to the cable 110 passing through RM. This perpendicular line is called reference line and intersects the cable 110 at the point P.

The reference line 130 is used to subjugate the speed that may be comprised by the method. For example, as is the case in FIG. 14, if M is late relative to the reference line 130 and the point P, the drone placed at B accelerates to bring M back over P in the following moments. The feedback loop calls on traditional techniques known in themselves. Succinctly, the feedback loop may account for the deviation observed between two intervals and adapt the speed accordingly.

The method may also comprise the subjugation of the heading of the drone placed at B. This subjugation may only involve the target position RM. The vector represents the pulling direction by the drone B of the cable. To come closer to the target point RM in the case of FIGS. 14 and 15, the drone B may give port rudder. The changes of heading per unit of time being restricted by the maximum curvature, excessive drag or stresses are not imposed on the cable 110. The maximum value of this change in heading over a particular time interval for example making it possible to limit the curvature of the trajectory may be deduced using the following known formula:

$$\frac{d\alpha}{dt} < \frac{V_e}{Rmin}$$

where Ve is the water speed of the cable, Rmin is the minimum curvature radius (inverse of the maximum curvature), and dt is the considered time interval.

The water speed of the cable may be known using the means already described, for example a speedometer or Doppler sonar placed on each drone and at a certain number of other points of the cable, including the selected point M. It is also possible to use the measurement of the pulling force, or the speed of rotation of the pitch of the propeller of the drone if applicable, through a hydrodynamic model of the entire system.

Figure 15:
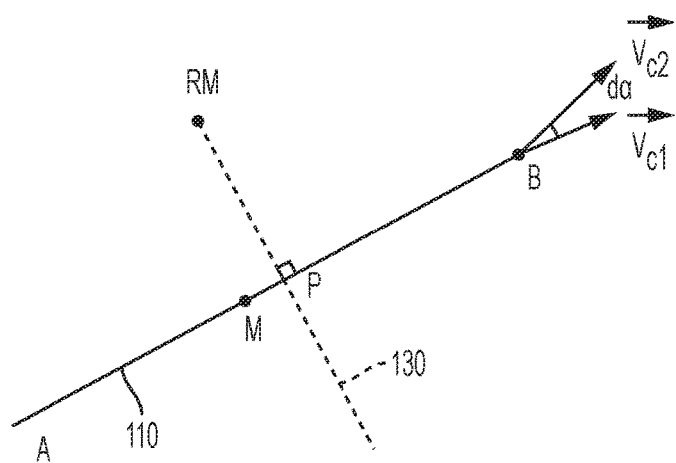

The speed and heading increments of the propeller may be given by a feedback loop, the aim of which is to bring the point M of the reference line closer as a priority (for the speed) and the fixed point RM while respecting the aforementioned heading change restrictions. FIG. 15 shows the old speed $\overrightarrow{Ve1}$ and the new incremented $\overrightarrow{Ve2}$ speed complying with these conditions.

Figure 16:
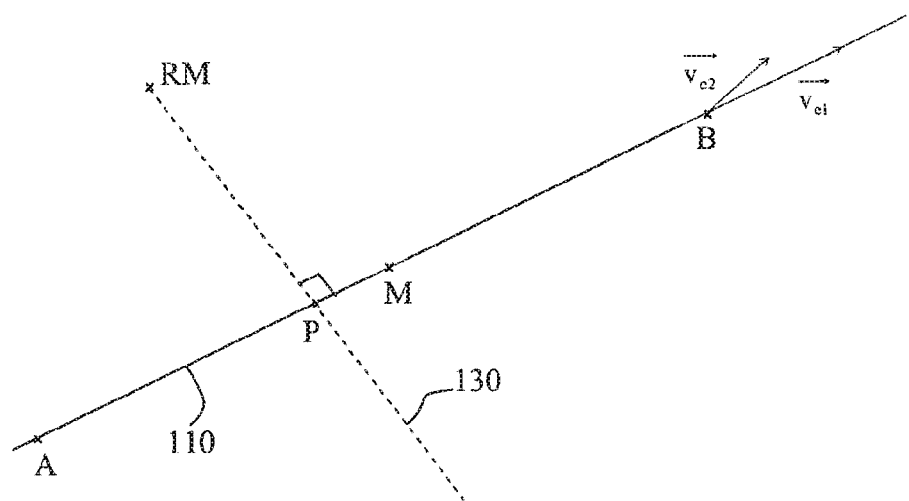
Figure 17:
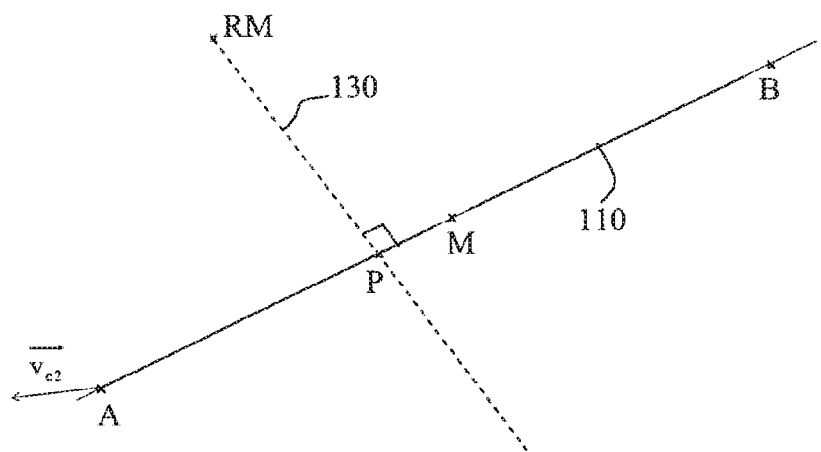

For a state where the point M has exceeded the reference line as shown in FIG. 16, the drone at B slows down while giving port rudder toward the target position with the same restrictions as before.

By decreasing its water speed, it may find itself at a moment where the speed becomes zero (no more pulling force) and it cannot be allowed to become negative, i.e. the propeller B pushing toward the rear of the cable. At that time, the order is given to the propellers A and B to trade functions, B then becoming inactive and A pulling in the opposite direction while having maneuvering freedom according to the same restrictions. In the case where the drone provides minimum tension, the transfer of functions takes place earlier once the pulling force of B becomes lower than the minimum tension required in the object.

The maintenance of the cable 110 in the quasi-stationary position may comprise a first phase for maintaining the cable according to the method of the example where a good prediction of the current is available, and a second phase for maintenance of the cable according to the method in real time where a good prediction of the current is not available. Such a method makes it possible to adapt the maintenance to the prediction data.

In particular, during the second phase, current data may be recorded and serve as a basis for the current prediction. It is then possible to enter the first phase. Furthermore, during the first phase, it is possible to monitor, for example by GPS, the deviation relative to the theoretical stationary position (with the actual sea current). In fact, the current predictions are not necessarily completely accurate, and there may be a deviation over the long-term between the determined stationary track and the theoretical stationary track. Once a deviation threshold is reached, it is then possible to enter the first phase. Thus, in general, it is possible to switch between the first phase and the second phase as a function of the available prediction values and/or a deviation relative to the stationary position.

Once again, all of the data necessary for the various subjugations may come, for A and B (and even intermediate points), from GPS positions, the tension applied by the propellers, speedometers or Doppler sonars, rudder angles, etc. This data feeds a computer program which, as a function of the given target point, will communicate the necessary speed and rudder orders to the propellers.

The method may also be implemented according to a second example, to which the teachings of the first example apply. The second example differs from the first example in that the desired route is a continuous straight line. Thus, it is desirable for the cable to move along a straight line relative to the terrestrial reference frame. The method of the second example allows longitudinal sweeping of a region of the subsoil to be prospected. In this example, the movement of the seismic source may comprise several portions following a line substantially perpendicular to the cable preferably passing substantially at a middle of the cable. In the reference frame connected to the cable, the seismic source thus performs back-and-forth movements along the line. A grid of wave emitting points is thus established that extends along the length of the cable.

The method can also be implemented according to a third example to which the teachings of the first example apply. This third example differs from the first example in that the desired route comprises the lateral movement of the cable relative to the terrestrial reference frame. In this example, the movement of the seismic source may comprise the track of lines substantially parallel to the cable, the lines being between two central cables of the device. The grid of wave emitting points is thus established that extends in a direction transverse to the length of the cable. This case may correspond to a drift situation of the cable depending on the constant component of the current.

The second and third examples of the method have advantages similar to the first example. Since the desired route is subject to a maximum speed value relative to the terrestrial reference frame, the seismic source has time to sweep the region to produce the waves and the seismic density is therefore only very slightly affected. The maximum speed value is less than 1 knot, preferably less than 0.5 knots, preferably less than 0.2 knots. However, a larger region may be swept, and discontinuity of periodic measurements may be avoided at the same time as one benefits from the constant component of the current so that the cables move relative to the terrestrial reference frame, as long as the route has the direction of that component.

The method may generally comprise a step for measuring the water speed. This measurement may serve as a basis for other steps of the method. For example, the measured speed may restrict the maximum curvature and/or the heading changes. The measured speed may be acquired using measuring means. This may be the speed either at the drones, or preferably at the ends of the submerged cable, or along the cable or the middle thereof. The surface currents may be different from the currents at 100 m deep, for example. Thus, in the case where a prediction of the surface currents is available, but the cable is submerged, the measured speed may serve to adapt the predictions to the depth at which the cable is located.

In this way, a computer program may contain instructions for implementing the method described above. This computer program may be stored on a traditional medium, such as a CD-ROM, a hard drive, or other types of memory, potentially split.

The seismic prospecting device may comprise one or more cables provided with sensors, such as the cable 110, and a computation unit for the evolution of the cable 110 in the water, restricted by a maximum track curvature value in the water and by a maximum deviation value relative to a desired route in the terrestrial reference frame, the route being suitably subjected to a maximum speed value relative to the terrestrial reference frame. In particular, the device is specially adapted to the implementation of the method previously described.

Such a device has a longer lifetime than the seismic prospecting systems of the prior art, since fewer stresses are inflicted on the cable. Furthermore, the device consumes less energy. The cable may also be provided with two drones each connected to one end of the cable. The cable may also be provided with ballasts.

The device may comprise several cables adapted to be kept in a quasi-stationary position substantially parallel to one another, each in the manner described above. The cables are, however, preferably capable of evolving freely relative to one another, such that no attachment means such as paravanes hinder the longitudinal movement of the device.

Figure 18:
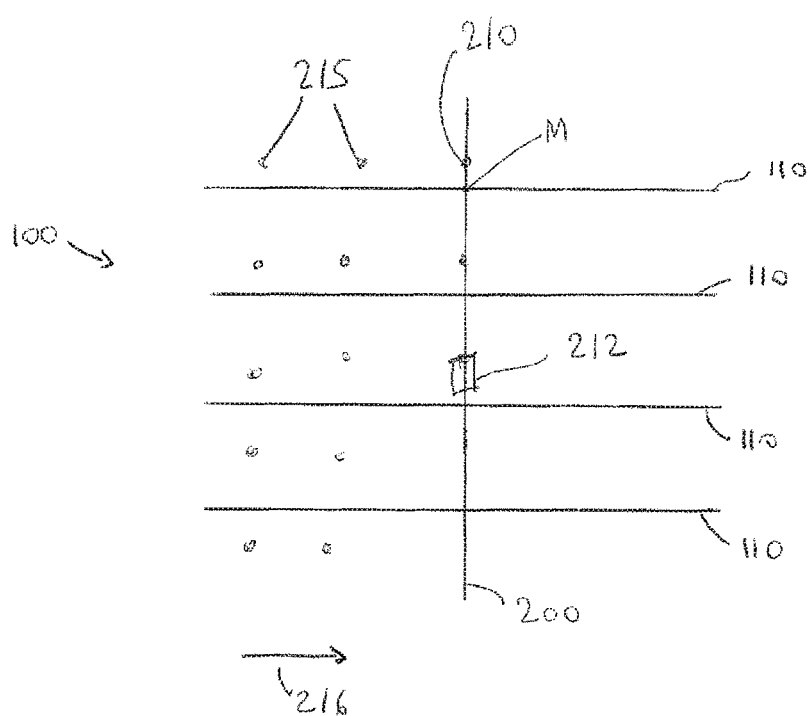
FIG. 18 shows a top view of the cables of the device of FIG. 1 and a line followed by a seismic source.
Figure 19:
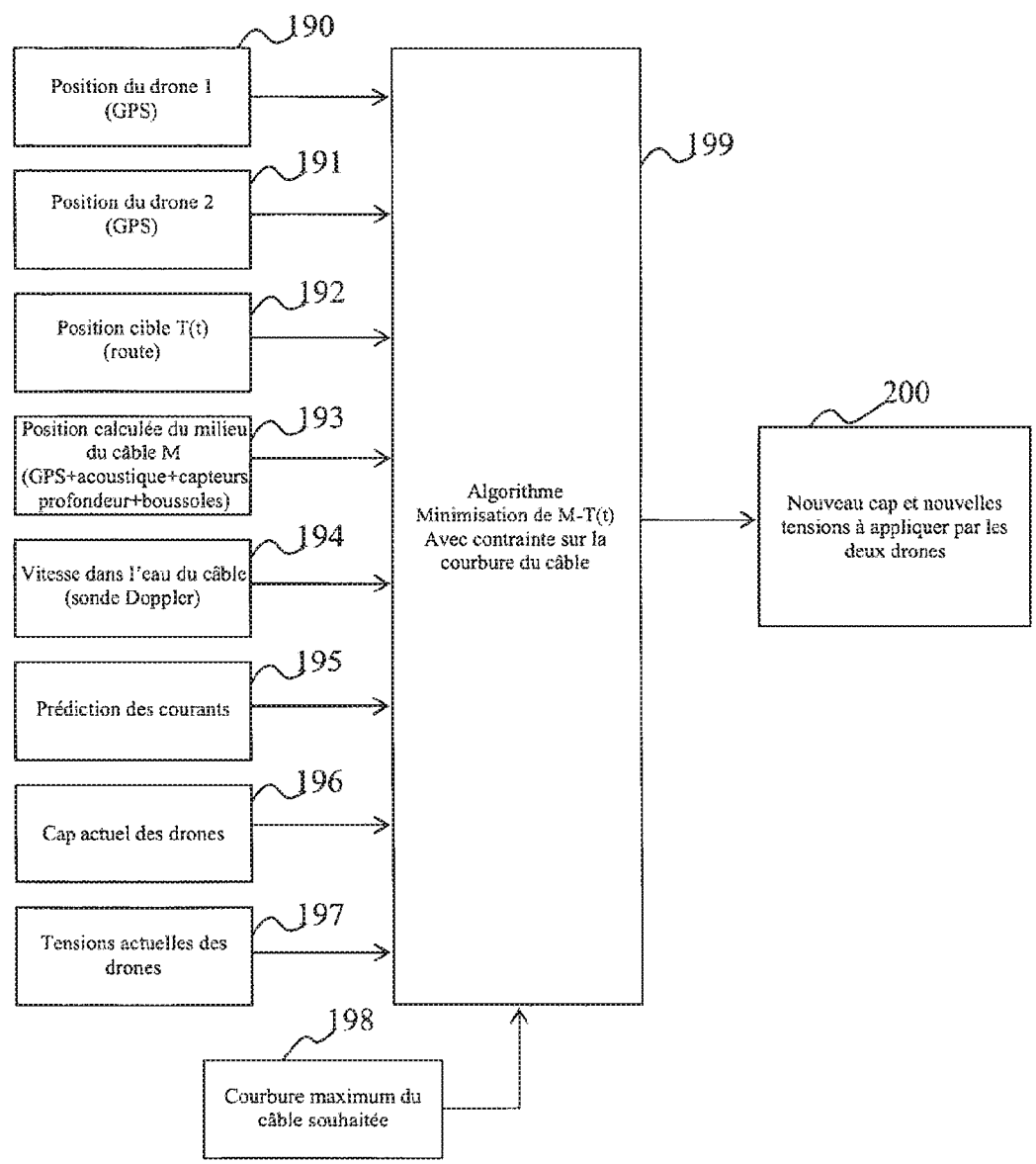
FIG. 19 shows an example of a feedback loop of the movement of the cable.

FIG. 18 shows a top view of the device 100 having a plurality of cables 110, which are substantially parallel. Also, FIG. 18 shows the following by a seismic source 212 of a line 200 substantially perpendicular to the cables 110 preferably passing substantially at a middle M of the cables. The line 200 has points 210 from which the seismic source 212 fires during following of the line 200. The points 215 represent (in the terrestrial reference frame) previous firings during the following of the line 200, the direction of movement of the cables being along the arrow 216 in the terrestrial reference frame. FIG. 19 shows an example of a feedback loop of the movement of the cable. In this example, the cable is subjected to a sea current and the movement of the cable and the water compensates the current. In the example, the movement of the cable is subject to the current. In the example, the cable is also provided with two drones, each connected to one end of the cable, denoted "drone 1" and "drone 2" in FIG. 19. The movement of the cable follows a feedback loop comprising an algorithm 199 using the following parameters as inputs:

the position (190 and 191) of each drone, obtained by GPS, the desired target position 192 obtained from the desired route, a computed position 193 of the middle of the cable M, obtained by GPS, acoustic, depth sensors and compasses, a water speed 194 of the cable measured by Doppler probe, a prediction 195 of the sea current, a current heading 196 of each drone, and the current tension 197 exerted by each drone on the cable.

As outputs 200, the algorithm 199 provides a new heading for each drone and new tension to be exerted by each drone on the cable. The algorithm may be chosen from among the algorithms known by those skilled in the art.

What is claimed is:

1. A method for seismic prospecting in an aquatic medium using a device comprising at least one seismic cable provided with sensors and at least one moving seismic source, comprising the following steps:

moving the cable in the water using two drones each placed at one end of the cable and which maintain tension in the cable that keeps the cable in a quasi-stationary or stationary position, the movement of the cable being restricted by minimizing the deviation of the cable with respect to a desired route in the terrestrial reference frame, the movement of the cable also being restricted by a maximum track curvature value in the water, and, at the same time, moving the seismic source, emitting waves via the seismic source, and sensing reflections of the waves by the cable, wherein at a moment the moving of the cable is performed, one of the two drones sets the cable in motion by orienting the heading by pulling in a first direction, while the other drone pulls in a second direction to maintain a minimum tension in the cable.

2. The method according to claim 1, wherein the cable is subject to a sea current and the movement of the cable in the water compensates the current.

3. The method according to claim 1, wherein the route is subject to a maximum speed value relative to the terrestrial reference frame, and the maximum speed value is less than 1 knot, preferably less than 0.5 knots, preferably less than 0.2 knots.

4. The method according to claim 1, wherein the device comprises several cables substantially parallel to one another throughout the method.

5. The method according to claim 4, wherein the device comprises between 15 and 25 cables, preferably 20 cables, the cable preferably having a length between 1 and 20 km, preferably between 2 and 6 km, preferably approximately 4 km, or between 6 and 14 km, preferably approximately 8 km, the cables being separated from one another by a distance comprised between 100 and 1,000 m, preferably between 200 and 800 m, preferably between 350 and 450 m.

6. The method according to claim 1, wherein the desired route comprises a position of the terrestrial reference frame that is fixed for a period of time.

7. The method according to claim 6, wherein the movement of the seismic source comprises following a line substantially perpendicular to the cable and preferably passing substantially at a middle of the cable, the period of time being substantially equal to the duration of following of the line.

8. The method according to claim 7, wherein the route comprises other positions of the terrestrial reference frame, each other position being fixed for a respective period of time, and the movement of the seismic source comprises following the line for the respective period of time, each respective period of time being substantially equal to the duration of following of the line.

9. The method according to claim 8, wherein the route also comprises longitudinal movements of the cable between the fixed positions of the terrestrial reference frame.

10. The method according to claim 6, wherein the movement of the seismic source comprises following several lines substantially perpendicular to the cable, the period of time being substantially equal to the duration of following of the lines.

11. The method according to claim 1, wherein the desired route is a straight line.

12. The method according to claim 11, wherein the movement of the seismic source comprises, several times, following a line substantially perpendicular to the cable and preferably passing substantially at a middle of the cable.

13. The method according to claim 1, wherein the route comprises the lateral movement of the cable relative to the terrestrial reference frame.

14. The method according to claim 13, wherein the movement of the seismic source comprises the track of lines substantially parallel to the cable, the lines being between two central cables of the device.

15. The method according to claim 1, wherein the maximum curvature depends on the length of the cable and the water speed.

16. The method according to claim 1, comprising measuring the water speed.

17. The method according to claim 1, wherein the two drones alternate to set the cable in motion.

18. The method according to claim 1, wherein the step for moving the cable in the water comprises the following sub-steps:

providing, in real-time, a desired target position from the desired route;

moving toward the target position, the movement being restricted by the maximum curvature;

the providing and moving sub-steps being repeated.

19. The method according to claim 18, wherein the movement toward the target position comprises a step of projecting the target position on the cable and a step of computing a maximum heading restricted by the maximum curvature value and the speed of the cable in the water.

20. A method for seismic prospecting in an aquatic medium using a device comprising at least one seismic cable provided with sensors and at least one moving seismic source comprising:
moving the cable in the water using two drones each placed at one end of the cable and which maintain tension in the cable that keeps the cable in a quasi-stationary or stationary position, the movement of the cable being restricted by minimizing the deviation of the cable with respect to a desired route in the terrestrial reference frame, the movement of the cable also being restricted by a maximum track curvature value in the water, and, at the same time,
moving the seismic source, emitting waves via the seismic source, and sensing reflections of the waves by the cable,
and wherein the method further comprising, before the step of moving the cable, the following steps:
providing prediction values for the sea current;
determining a theoretical track of the cable in the water precisely corresponding to the desired route, as a function of the prediction values of the sea current;
determining an actual track of the cable in the water by approximating the theoretical track while minimizing the deviation between the actual track and the theoretical track, the minimization being restricted by the maximum curvature;
the movement of the cable in the water following the actual track.

21. A method for seismic prospecting according to claim 20, comprising:
a first seismic prospecting phase comprising:
the providing of prediction values for the sea current;
the determining of a theoretical track of the cable in the water precisely corresponding to the desired route, as a function of the prediction values of the sea current;
the determining of an actual track of the cable in the water by approximating the theoretical track while minimizing the deviation between the actual track and the theoretical track, the minimization being restricted by the maximum curvature; the movement of the cable in the water following the actual track; and then;
the moving of the cable in the water using the two drones, the movement of the cable minimizing the deviation of the cable with respect to the desired route in the terrestrial reference frame, the movement of the cable also being restricted by the maximum track curvature value in the water, and, at the same time;
the moving of the seismic source in a reference frame connected to the cable, the emitting of the waves via the seismic source, and the sensing of the reflections of the waves by the cable; and
a second seismic prospecting phase comprising:
moving again the cable in the water using the two drones, the movement of the cable minimizing the deviation of the cable with respect to the desired route in the terrestrial reference frame, the movement of the cable also being restricted by the maximum track curvature value in the water, including the sub-steps of providing, in real-time, a desired target position from the desired route and moving toward the target position, the movement being restricted by the maximum curvature, the two provision and movement sub-steps being repeated; and at the same time,
moving again the seismic source in a reference frame connected to the cable, emitting waves via the seismic source, and sensing reflections of the waves by the cable.

22. The method according to claim 21, comprising switching between the first phase and the second phase as a function of the available prediction values and/or a deviation with respect to the target position.

23. A seismic prospecting device, comprising:
at least one cable provided with sensors and two drones each placed at one end of the cable for moving the cable and maintaining tension in the cable that keeps the cable in a quasi-stationary or stationary position;
a computation unit for determining the movement of the cable in the water, the movement of the cable being restricted by minimizing the deviation of the cable with respect to a desired route in the terrestrial reference frame, the movement of the cable also being restricted by a maximum track curvature value in the water,
wherein at a moment the moving of the cable is performed, one of the two drones sets the cable in motion by orienting the heading by pulling in a first direction, while the other drone pulls in a second direction to maintain a minimum tension in the cable.

24. The device according to claim 23, wherein the cable is also provided with ballasts.

25. The device according to claim 23, also comprising means for measuring the water speed of the cable.

26. The device according claim 23, wherein the cable has a length preferably between 1 and 20 km, preferably between 2 and 6 km, preferably approximately 4 km, or between 6 and 14 km, preferably approximately 8 km.

27. The device according to claim 23, comprising several cables capable of being set in motion freely with respect to one another.

28. A method for deploying, in an aquatic medium, a device comprising at least one seismic cable provided with sensors, comprising a step consisting of moving the cable in the water using two drones each placed at one end of the cable and maintaining tension in the cable that keeps the cable in a quasi-stationary or stationary position, the movement of the cable being restricted by minimizing the deviation of the cable relative to a desired route in the terrestrial reference frame, the movement of the cable also being restricted by a maximum track curvature value in the water, wherein at a moment the moving of the cable is performed, one of the two drones sets the cable in motion by orienting the heading by pulling in a first direction, while the other drone pulls in a second direction to maintain a minimum tension in the cable.

29. The method according to claim 28, wherein the desired route comprises a position of the terrestrial reference frame that is fixed for a period of time.

30. The method according to claim 28, wherein the cable is subject to a sea current and the movement of the cable in the water compensates the current.

31. The method according to claim 30, wherein the movement of the cable is subjugated to the current.

32. A method for seismic prospecting in an aquatic medium using a device comprising at least one seismic cable provided with sensors and at least one moving seismic source, comprising the following steps:

moving the cable in the water using two drones each placed at one end of the cable and which maintain tension in the cable that keeps the cable in a quasi-stationary or stationary position, the movement of the cable being restricted by minimizing the deviation of the cable with respect to a desired route in the terrestrial reference frame, the movement of the cable also being restricted by a maximum track curvature value in the water, and, at the same time, moving the seismic source, emitting waves via the seismic source, and sensing reflections of the waves by the cable, wherein the movement of the cable follows a feedback loop comprising an algorithm using as inputs a position of each drone, a desired target position from the desired route, a computed position of the middle of the cable, a measured water speed of the cable, a prediction of the sea current, a current heading of each drone and/or a current tension exerted by each drone on the cable, and the algorithm providing, as output, a new heading of each drone and/or a new tension to be exerted by each drone on the cable.

\* \* \* \* \*